United States Patent [19]

Rolleston et al.

[11] Patent Number: 5,594,557
[45] Date of Patent: Jan. 14, 1997

[54] COLOR PRINTER CALIBRATION CORRECTING FOR LOCAL PRINTER NON-LINEARITIES

[75] Inventors: Robert J. Rolleston, Penfield; Martin S. Maltz, Rochester, both of N.Y.

[73] Assignee: Xerox Corporation, Stamford, Conn.

[21] Appl. No.: 316,968

[22] Filed: Oct. 3, 1994

[51] Int. Cl.[6] ................................ H04N 1/46; G03F 3/08
[52] U.S. Cl. ........................ 358/518; 358/504; 358/525
[58] Field of Search ..................................... 358/500, 501, 358/504, 406, 515, 518, 519, 520, 521, 523, 524, 525, 530, 531, 535, 538, 529; 382/167; 348/30, 649, 651; 345/153, 154, 199

[56] References Cited

U.S. PATENT DOCUMENTS

| | | |
|---|---|---|
| 2,790,844 | 4/1957 | Neugebauer . |
| 4,275,413 | 6/1981 | Sakamoto et al. . |
| 4,500,919 | 2/1985 | Schreiber . |
| 4,941,039 | 7/1990 | D'Errico .................................. 358/518 |
| 4,992,861 | 2/1991 | D'Errico .................................. 358/518 |
| 5,296,923 | 3/1994 | Hung ........................................ 358/527 |
| 5,305,119 | 4/1994 | Rolleston et al. ........................ 358/523 |
| 5,311,332 | 5/1994 | Imao et al. ............................... 358/518 |
| 5,323,249 | 6/1994 | Liang ....................................... 358/520 |
| 5,377,041 | 12/1994 | Spaulding et al. ...................... 358/518 |
| 5,390,035 | 2/1995 | Kasson et al. ........................... 358/525 |
| 5,416,613 | 5/1995 | Rolleston et al. ........................ 358/518 |
| 5,428,465 | 6/1995 | Kanamori et al. ....................... 358/518 |
| 5,471,324 | 11/1995 | Rolleston ................................. 358/525 |

OTHER PUBLICATIONS

Po–Chieh Hung, "Tetrahedral Division Technique Applied to Colorimetric Calibration for Imaging Media", Annual Meeting IS&T, NJ, May, 1992, pp. 419–422.
Po–Chieh Hung, "Colorimetric Calibration for Scanners and Media", SPIE, vol. 1448, Camera and Input Scanner System (1991).
Sigfredo I. Nin et al, "Printing CIELAB Images on a CMYK Printer Using Tri–Linear Interpolation", SPIE Proceedings, vol. 1670, 1992, pp. 316–324.
William J. Gordon et al, "Shepard's Method of 'Metric Interpolation' to Bivariate and Multivariate Interpolation", Mathematics of Computation, vol. 32, No. 141, Jan. 1978, pp. 253–264.
P. Lancaster et al, "Surfaces Generated by Moving Least Squares Methods"; Mathematics of Computation, vol. 32, No. 155, Jul. 1981, pp. 141–158.
P. Laihanen, "Colour Reproduction Theory Based on the Principles of Colour Science"; Advances in Printing Science & Technology, W. H. Banks ed, Pentech Press, London 1988, pp. 1–36.
P. Laihanen, "Optimization of Digital Color Reproduction on the Basis of Visual Assessment of Reproduced Images", Proceedings of the SID, vol. 30, No. 3, 1989, pp. 183–190.
D. Shepard, "A Two–Dimensional Interpolation Function for Irregularly–Spaced Data", Proceedings–1968 ACM National Conference, pp. 517–524.

*Primary Examiner*—Scott A. Rogers
*Assistant Examiner*—Kimberly A. Williams
*Attorney, Agent, or Firm*—Mark Costello

[57] ABSTRACT

A color printer calibration method for improving printer accuracy in regions of local non-linearity includes the steps of: a) starting with filled rectangular array of color mappings $A_0$ mapping printer signals to device independent color space signals; b) empirically deriving a set of color mappings $P_i$ in an area of interest; c) using a set of planes defined by the color mappings of $A_0$, and the set of empirically derived color mappings $P_i$, identifying a new set of planes such that each point defined by $A_0$ and each point defined by $P_i$ is located at the intersection of three planes, the intersection points of this expanded number of planes defining a set of points $P_{i(expanded)}$ that define a full rectangular array $A_1$ of mappings including mappings $A_0$, mappings $P_i$ and mappings $P_{i(expanded)}$; d) storing the mapping $A_1$ for use in the creation of a new color space transformation LUT for use with the printer.

9 Claims, 5 Drawing Sheets

COLOR PRINTER CALIBRATION CORRECTING FOR LOCAL PRINTER NON-LINEARITIES

CROSS REFERENCE

Cross reference is made to the following co-pending applications: U.S. Ser. No. 07/955,075, now U.S. Pat. No. 5,305,119 filed Oct. 1, 1992, entitled "Color Printer Calibration Architecture", by R. J. Rolleston et al. (assigned to the same assignee as the present application); U.S. Ser. No. 08/131,168, filed Oct. 4, 1993, entitled "Reduced Storage of Pre-Computed Difference Tables Used In Color Space Conversion", by R. J. Rolleston (assigned to the same assignee as the present application); U.S. Ser. No. 08/144,987, now U.S. Pat. No. 5,416,613 filed Oct. 29, 1993, entitled "Color Printer Calibration Test Pattern" by R. J. Rolleston et al. (assigned to the same assignee as the present application); U.S. Ser. No. 08/179,284, filed Jan. 10, 1994, entitled "Color Printer Calibration Architecture", by R. J. Rolleston et a. (assigned to the same assignee as the present application); U.S. Ser. No. 08/223,194, now U.S. Pat. No. 5,471,324 filed Apr. 5, 1994, entitled "Color Printer Calibration with Improved Color Mapping Linearity", by R. J. Rolleston (assigned to the same assignee as the present application); and U.S. Ser. No. 08/254,629, now U.S. Pat. No. 5,483,360 filed Jun. 6, 1994, entitled "Color Printer Calibration with Blended Lookup Tables", by R. J. Rolleston et al. (assigned to the same assignee as the present application).

FIELD OF THE INVENTION

The present invention is directed towards compiling look up tables representative of printer characteristics, to enable the conversion of colors defined in a first color space to colors defined in the printer color space, and more particularly to a method of making such table more linear.

INCORPORATION BY REFERENCE

The following patents are specifically incorporated by reference: U.S. Pat. No. 4,500,919 to Schreiber for its teachings of a color conversion system converting information from RGB to CMYK; U.S. Pat. No. 4,275,413 to Sakamoto for its teachings of tetrahedral interpolation between first and second color spaces; and U.S. Pat. No. 2,790,844 to Neugebauer disclosing the desirability of defining an image in a first standard color space prior to conversion of the image coordinates to a second printer based coordinate system, and U.S. Pat. No. 5,296,923 to Hung. The following articles are also hereby incorporated by reference: Po-Chieh Hung, "Tetrahedral Division Technique Applied to Colorimetric Calibration for Imaging Media", Annual Meeting IS&T, NJ, May, 1992, pp. 419–422; Po-Chieh Hung, "Colorimetric Calibration for Scanners and Media", SPIE, Vol. 1448, Camera and Input Scanner System, (1991); Sigfredo I. Nin, et al., "Printing CIELAB Images on a CMYK Printer Using Tri-Linear Interpolation", SPIE Proceedings, Vol. 1670, 1992, pp. 316–324; William J. Gordon et al., "Shepard's Method of 'Metric Interpolation' to Bivariate and Multivariate Interpolation", Mathematics of Computation, Vol. 32, No. 141, January 1978, pp. 253–264; P. Lancaster et al., "Surfaces Generated by Moving Least Squares Methods", Mathematics of Computation, Vol. 32, No. 155, July 1981, pp.141–158; Pekka Laihanen, "Colour Reproduction Theory Based on the Principles of Colour Science", Advances in Printing Science and Technology, W. H. Banks ed., Pentech Press, London, 1988, pp. 1–36; Pekka Laihanen, "Optimization of Digital Color Reproduction on the Basis of Visual Assessment of Reproduced Images", Proceedings of the SID, Vol 30. No. 3, 1989, pp. 183–190; and Donald Shepard, "A two-dimensional interpolation function for irregularly spaced data," Proceedings-1968 ACM National Conference, pp. 517–524.

BACKGROUND OF THE INVENTION

The generation of color documents can be thought of as a two step process: first, the generation of the image by means of scanning an original document with a color image input terminal or scanner or, alternatively, creating a color image on a work station operated in accordance with a color image creation program; and secondly, printing of that image with a color printer in accordance with the colors defined by the scanner or computer generated image. Scanner output is commonly transformed to a color space of tristimulus values, i.e., RGB (red-green-blue). Commonly, these values are a linear transformation of the standard XYZ coordinates of CIE color space, or a corrected transform of those values. In the case of computer generated images, colors defined by the user at the user interface of a workstation can be defined initially in color space of tristimulus values. These colors are defined independently of any particular device, and accordingly reference is made to the information as being "device independent".

Printers often have an output which can be defined as existing in a color space called CMYK (cyan-magenta-yellow-key or black) which is uniquely defined for the printer by its capabilities and colorants. Printers operate by the addition of multiple layers of ink or colorant in layers to a page. The response of the printer tends to be relatively non-linear. These colors are defined for a particular device, and accordingly reference is made to the information as being "device dependent". Thus, while a printer receives information in a device independent color space, it must convert that information to print in a device dependent color space, which reflects the gamut or possible range of colors of the printer.

The desirability of operating in a device independent color space with subsequent conversion to a device dependent color space is well known, as shown by U.S. Pat. No. 4,500,919 to Schreiber and U.S. Pat. No. 2,790,844 to Neugebauer, and U.S. Pat. No. 4,275,413 to Sakamoto. There are many methods of conversion between color spaces, all of which begin with the measurement of printer response to certain input values. Commonly, a printer is driven with a set of input values reflecting color samples throughout the printer gamut, the color samples are printed in normal operation of the printer. As previously noted, most printers have non-linear response characteristics.

In U.S. Pat. No. 4,275,413 to Sakamoto, the information derived is placed into lookup tables, stored in a memory, perhaps ROM memory or RAM memory where the lookup table relates input color space to output color space. The lookup table is commonly a three dimensional table since color is defined with three variables. In RGB space, at a scanner or computer, space can be defined as three dimensional with black at the origin of a three dimensional coordinate system 0, 0, 0, and white at the maximum of a three dimensional coordinate system which an 8-bit system, would be located at 255, 255, 255. Each of the three axes radiating from the origin point therefore respectively define red, green, and blue. A similar construct can be made for the printer, with axes representing cyan, magenta, and yellow. In the 8-bit system suggested, there will be, however, over 16 million possible colors (256³). There are clearly too many values for a 1:1 mapping of RGB to CMY. Accordingly, as proposed in U.S. Pat. No. 4,275,413 to Sakamoto, only a relatively small number of samples are used to do the mapping from RGB to CMY, perhaps on the order of 1,000. Therefore, the lookup tables consist of a set of values which could be said to be the intersections for corners of a set of cubes mounted on top of one another. Colors falling within each cubic volume can be interpolated from the measured values, through many methods including tri-linear interpolation, tetrahedral interpolation, polynomial interpolation, linear interpolation, and any other interpolation method depending on the desired speed and accuracy of the result.

It would be very easy to index device dependent color values or specifications to device independent color specifications, but that is not the requirement. Instead, device independent specifications must be mapped to device dependent specifications. Several problems arise. Of course, the primary problem is that the printer response is not a linear response. A second problem is that the color space, and therefore the coordinates defined in the color space must be maintained as a uniform grid, for maximum efficiency of some interpolation methods, particularly for tetrahedral interpolation, a very desirable method of interpolation.

Accordingly, a three dimensional look up table (LUT) may be constructed which puts device independent input values into a predictable grid pattern. One method of accomplishing this requirement is by an interpolation process which derives a value at a desired location as a function of all (or a significant set) of measured color values. One way of doing this is to use Shepard's Method (see, for example "Shepard's Method of 'Metric Interpolation' to Bivariate and Multivariate Interpolation" by W. Gordon and J. Wixom, Mathematics of Computation, Vol. 32, No. 141, January 1978, pp. 253–264). Shepard's Method suggests that a vector can be thought of as defining the difference between an asked-for color which was directed to a printer in the printed color. Then, for any other point in color space which is desired, that point can be thought of as a vector quantity, derived by averaging over the space all the vectors, each vector weighted by a function which decreases its effect on the vector as that vector is further and further away from the point coloring question. In one useful formula, each vector is weighted by a function of $1/d^4$.

Alternatively the method of Po-Chieh Hung, "Colorimetric Calibration for Scanners and Media", SPIE, Vol. 1448, Camera and input Scanner System, (1991), describes a method of inverse tetrahedral interpolation, to the same effect as the described Shepard's Method (see also U.S. Pat. No. 5,296,923 to Hung, previously incorporated by reference for its teachings). A requirement of this method is that the color space be segmented into a set of non-overlapping, space-filling tetrahedrons. This segmentation requirement is fulfilled by using only data from a full rectangular array of points, where it is easy to define the mesh of points which define the tetrahedrons.

A problem encountered in the calibration process is that of having most colors being reproduced successfully, but having a few regions of color space that are not well behaved in terms of the empirically derived calibration model. The addition of a few more calibration points in these poorly behaved areas, would appear to be a solution to the problem. However, because inverse tetrahedral interpolation requires a full rectangular grid of data points, to obtain the "few more calibration points" in the poorly behaved areas really requires the addition of hundreds of more calibration points.

Figure 1A:
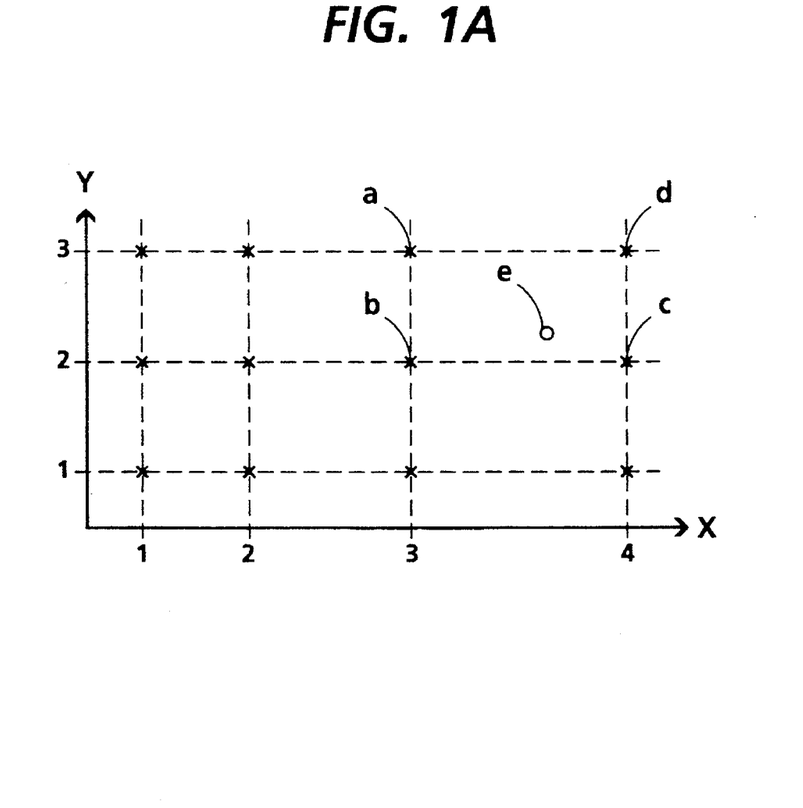
FIGS. 1A and 1B show the problem addressed by the present invention in a two dimensional example.

FIG. 1 illustrates the problem in two dimensions for simplicity, where a, b, c and d represent colors which reproduce successfully in a color space transformation, while point e does not. Adding points $P_i$, as in FIG. 1A presumably would resolve the reproduction problem, but that arrangement does not provide a color space which is readily segmentable into a set of non-overlapping, space-filling tetrahedrons. This segmentation requirement is fulfilled by using only data from a full rectangular array of points.

The references cited herein are incorporated by reference for their teachings.

SUMMARY OF THE INVENTION

In accordance with the invention there is provided a calibration method providing additional data points to support inverse tetrahedral interpolation for the derivation of color space transformation look up tables, without substantially increasing the amount of empirically measured data.

In accordance with one aspect of the invention, the color printer calibration method for improving printer accuracy in regions of local non-linearity includes the steps of: a) starting with filled rectangular array of color mappings $A_0$ mapping printer signals to device independent color space signals; b) empirically deriving a set of color mappings $P_i$ in an area of interest; c) using a set of planes defined by the color mappings of $A_0$, and the set of empirically derived color mappings $P_i$, identifying a new set of planes such that each point defined by $A_0$ and each point defined by $P_i$ is located at the intersection of three planes, the intersection points of this expanded number of planes defining a set of points $P_{i(expanded)}$ that define a full rectangular array $A_1$ of mappings including mappings $A_0$, mappings $P_i$ and mappings $P_{i(expanded)}$; d) storing said mapping $A_1$ for use in the creation of a new color space transformation LUT for use with said printer.

In accordance with another aspect of the invention, the method includes, before step d), the step of substituting into mapping $A_1$, any empirically derived mappings from $A_0$ and any empirically derived mappings from $P_i$.

In accordance with yet another aspect of the invention, the method includes, before step d), the step of replacing mappings in $A_1$ that are defined by points from mapping $A_0$ and near a value of mapping $P_i$, with new mapping values which take into account the nearby $P_i$ mappings.

In using the described method, the goal of obtaining a filled rectangular or three dimensional mapping is obtained, while additionally improving calibration results through the use of the new empirical data to describe color mapping adjacent to the new empirical points.

These and other aspects of the invention will become apparent from the following descriptions to illustrate a preferred embodiment of the invention read in conjunction with the accompanying drawings in which:

Figure 2:
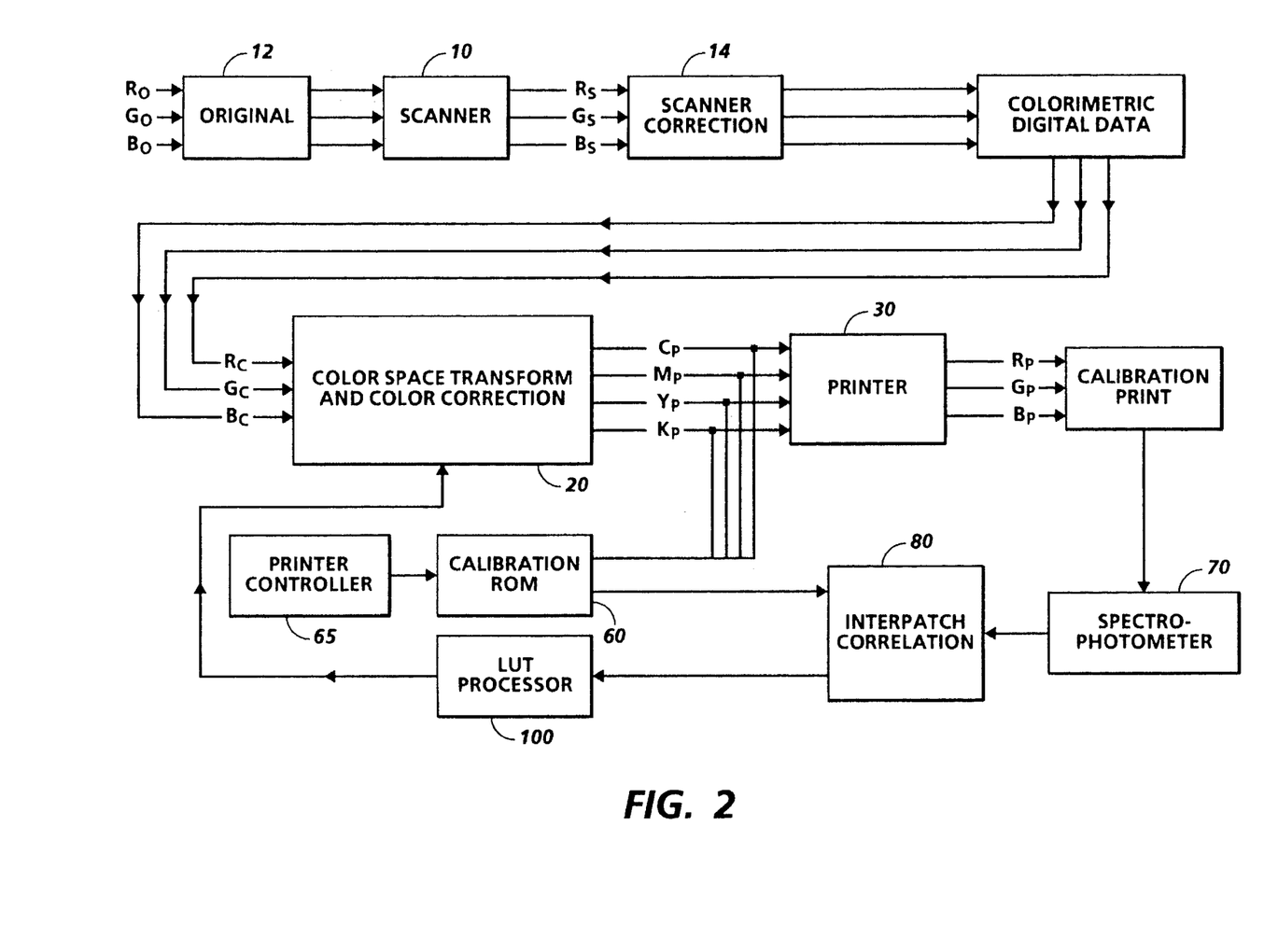
FIGS. 2 and 3 together illustrate an overall system block diagram showing a color printing system in which the present invention might find use.

Referring now to the drawings where the showings are for the purpose of describing an embodiment of the invention and not for limiting same, a basic system for carrying out the present invention is shown in FIG. 2. In a system, a scanner 10, such as perhaps the color scanner available in the Xerox 5775 digital color copiers, which can be calibrated to produce a set of digital colorimetric or device independent data describing a scanned image 12, which, by definition can be defined in terms of the colorimetric $R_o, G_o, B_o$ space. Resulting from the scanning operation is a set of scanner image signals $R_s$, $G_s$, $B_s$, defined in device dependent scanner terms. Incorporated into the scanner or another processing path is a post-scanning processor 14, which provides correction of scanner image signals $R_s$, $G_s$, $B_s$ to colorimetric terms, $R_c$, $G_c$, $B_c$, typically digital in nature. The values may be in terms of CIE color space (r,g,b), or the L*a*b* luminance-chrominance space ($LC_1C_2$). A color space transform, indicated by block 20, such as that described in U.S. Pat. No. 4,275,413 to Sakamoto, is used to convert the device independent data to device dependent data. The output of color space transform 20 is the image defined in terms of a device dependent space, or colorant driving signal $C_p$, $M_p$, $Y_p$, $K_p$ that will be used to drive a printer 30. In one possible example, the colorant values represent the relative amounts of cyan, magenta, yellow, and black toners that are to be deposited over a given area in an electrophotographic printer, such as, again, Xerox 5775 digital color copiers. The printed output image may be said to be defined in terms of $R_p, G_p, B_p$, which are hoped to have a relationship with $R_o, G_o, B_o$ such that the printed output image has a color that is colorimetrically similar to the original image, although that similarity is ultimately dependent upon the gamut of the printing device. As described in U.S. patent application Ser. No. 07/955,075 by Rolleston, entitled "Color Printer Calibration Architecture", black addition for under color removal and gray balance processing may also be combined into the color space transform element. Although these features are not required, they are desirable and are illustrated herein. When we refer to colorimetric spaces, we are referring to spaces which are transforms of CIE XYZ space (1931). Such colorimetric spaces are also inherently device independent. When we refer to device dependent space, we refer to a color space which is defined only in terms of operation of the device using it. While many color spaces have three dimensions, it is possible to have color spaces with less than three dimensions or more than three dimensions.

Figure 3:
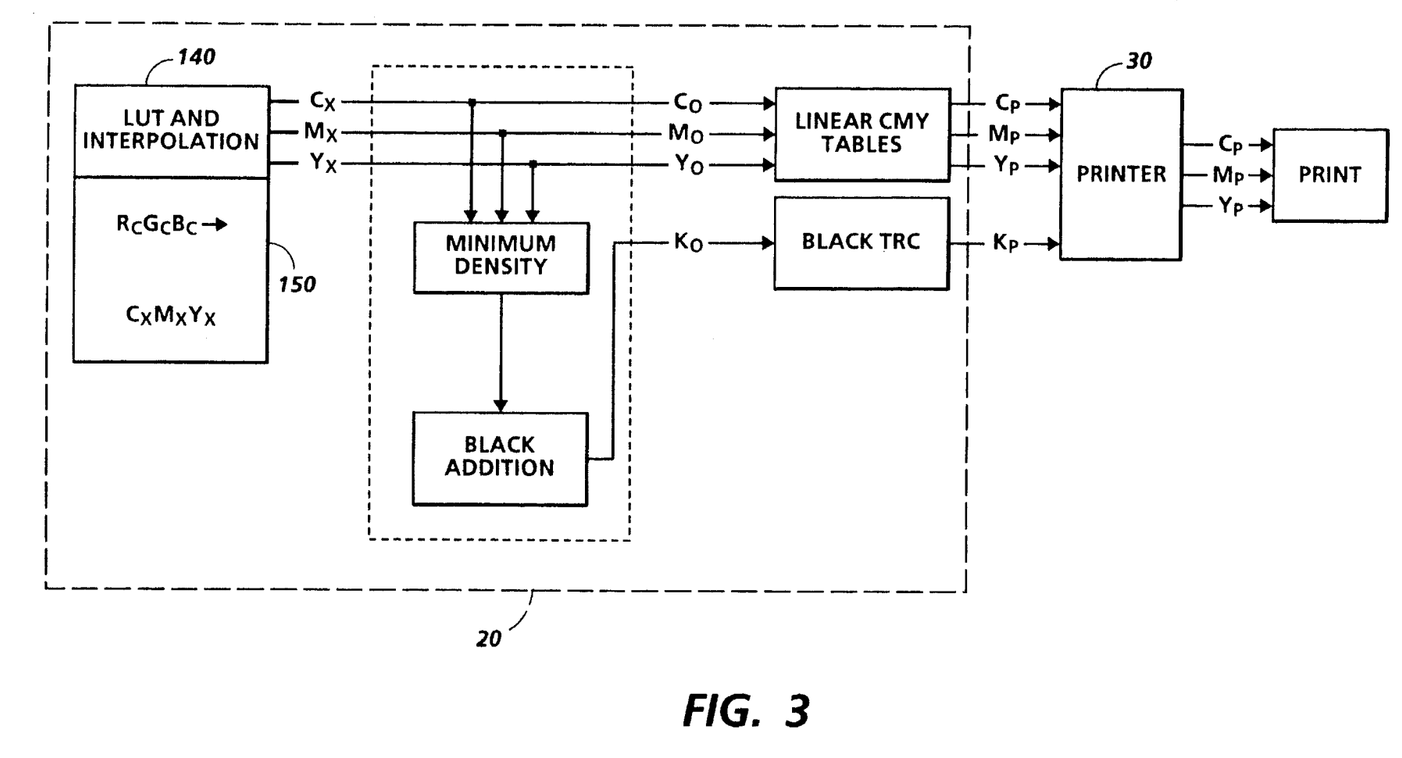

With reference now to FIG. 3, and color space transformation and color correction 20, initially, $R_c$, $G_c$, $B_c$ color signals are directed to an interpolation device 140, which includes a three dimensional lookup table stored in a device memory 150 such as a RAM or other addressable memory device, which will meet speed and memory requirements for a particular device. Color signals $R_c$, $G_c$, $B_c$ are processed to generate address entries to the table which stores a set of transform coefficients with which the $R_c$, $G_c$, $B_c$ may be processed to convert them to $C_x$, $M_x$, $Y_x$ colorant signals or any multi-dimensional output color space including but not limited to CMYK or spectral data. Values which are not mapped may be determined through interpolation.

It will no doubt be recognized that there are many methods of providing a transform from device independent data to device dependent data, with U.S. Pat. No. 4,275,413 to Sakamoto describing one method, which itself can be varied. Once a conversion table is established, a method of interpolation referred to as tri-linear or cubic interpolation may also be used to calculate output values from the limited set of input values.

To create the table, a set of color patches are created, preferably including determined linearization and black addition. This is done by printing and measuring about 1000 to 4000 patches of printer colors distributed throughout the color space, i.e., a large set of printer driving signals are generated, in varying densities of combinations of C,M,Y,K, and used to drive the printer. The color of each patch is measured, using a spectrophotometer to determine color in terms of $R_c, B_c, G_c$. The measured colors of these patches are used to build a three dimensional lookup table (LUT) relating $R_c, B_c, G_c$ defined colors to $C_x M_x Y_x$ defined colors. Conversions that do not include mapped and measured points may be interpolated or extrapolated. Reference is made to U.S. patent application Ser. No. 08/144,987 to Rolleston entitled, "Color Printer Calibration Test Pattern", filed Oct. 29, 1993, which shows and describes a calibration test pattern for this purpose.

With reference again to FIG. 2, a calibration image is conveniently stored in a device memory such as calibration ROM 60, RAM, floppy or the like, or are generated on the fly with a predetermined generation function. Signals stored therein are directed to the printer under the control of printer controller 65. Spectrophotometer 70 (which can alternatively be a colorimeter, a calibrated densitometer or even a calibrated color scanner) is used to scan the calibration target and produce $R_o G_o B_o$ signal values as a function of sensed density, representing the colors of each scanned patch. Interpatch correlation processor 80 reads the responses provided from spectrophotometer 70 for each location in the calibration target and correlates the response with the input CMY signals, so that an $R_c G_c B_c$ to CMY mapping is generated. The data derived at interpatch correlation processor 80 is directed to LUT processor 100, which generates the required lookup tables for storage in color space transform and color correction 20.

Now the principle of the present invention will be described with reference to FIG. 1A, 1B and FIG. 4. FIG. 1A is a two dimensional color space example chosen to simplify the more common problem in three dimensions. FIG. 1A illustrates the required regular array of data values $A_0$ with example mappings indicated by X's at points a, b, c and d. The problem is that printing a color corresponding to mapping O at point e is desired, but when that mapping is interpolated using existing data, it does not provide the expected color. If the surrounding mappings at points a(3,3), b(3,2), c(4,2) and d(4,3) are correct or acceptable, it may be concluded that the response of the system in this region of color space is very non-linear, and that linear interpolation from existing data will produce errors in the output. An improved characterization of the system response is required.

Figure 1B:
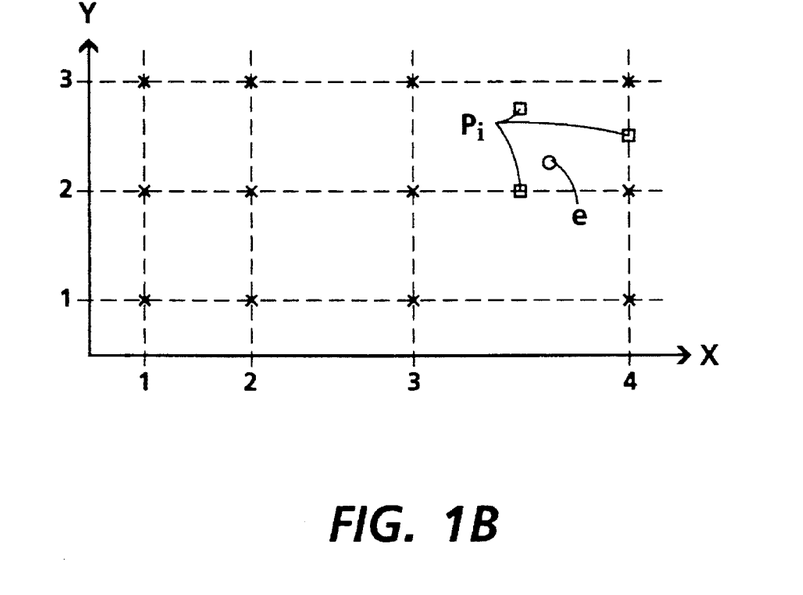

To obtain a better characterization of the printing system in this region, three more color patches are generated (a set referred to as $P_i$), generally within the limits of the region, and the printer response is measured, as indicated by the hollow squares in FIG. 1B. The new patches $P_i$ are located at (x,y)=(3.5, 2) (3.5, 2.75) and (4, 2.5). The actual locations and number of these patches can vary.

The newly derived mappings $P_i$ cannot simply be added to the calibration set, because they will create situations where the region would not be divisible into non-overlapping space filling triangles (or tetrahedrons in the 3-D case). In the original data set $A_0$, two non-overlapping space filling triangles in this region were formed by the points [(3,2), (4,2), (4,3)] and [(3,3), (3,2), (4,3)].

Figure 4:
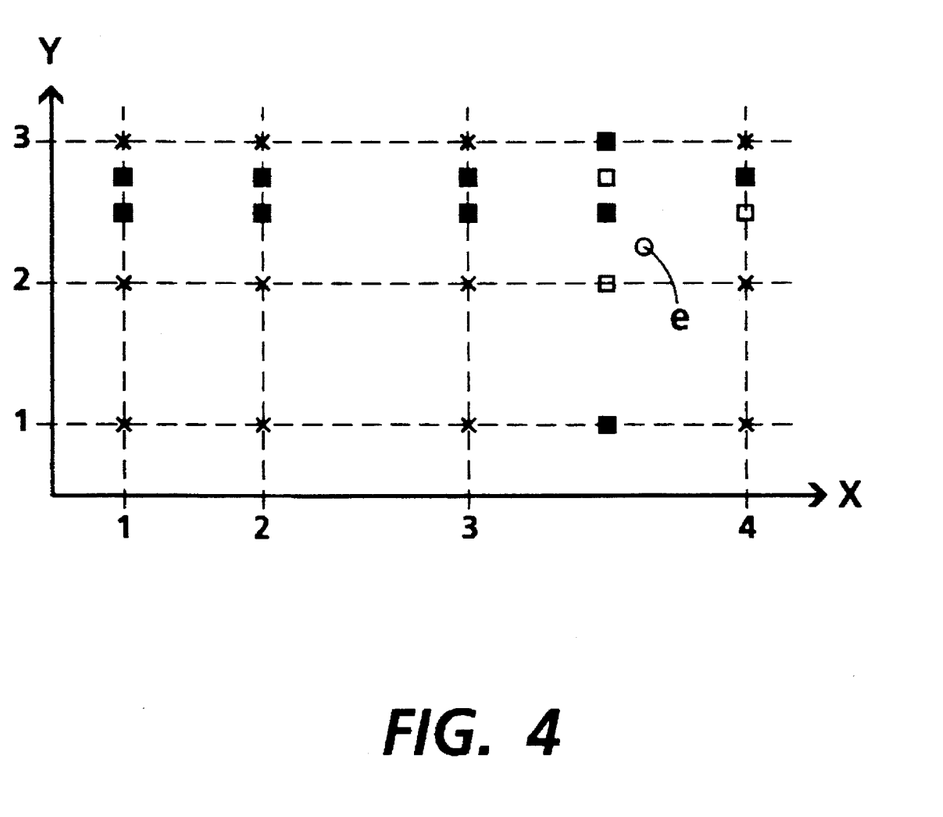
FIG. 4 shows the principle of the present invention, whereby after derivation of new empirical values, a new filled rectangular array must be generated.

The inventive solution, illustrated in FIG. 4, divides the region defined by these points into sets of smaller squares using linear interpolation and weighted averaging to estimate required values. This works in the 2-D case described here, but to maintain continuity across the boundary in the third dimension it is also necessary to add in an entire line (or plane, in the 3-D case) of new data points. That is, we must have a value at x=3.5 for every possible Y value, and we must have a value at y=3.5 and y=3.75 for every possible X value. The set of new points ($P_{i(expanded)}$) which we must calculate are shown as solid squares in FIG. 4. Initially, these values are based on the set of mappings $A_0$.

Note that this process has the effect of maintaining a full and filled rectangular array of points, even though only a few new points on each line (or plane) were measured. The points on the line (or plane) which were not measured are obtained by linear interpolation. This is the same type of interpolation that would have been done later in the use of the data set, and is done in regions where we have not seen a problem with assuming a linear response of the system.

In addition to adding new data points by linear interpolation, the points which are "near" the new set of measured points (for example; the three points indicated by black squares at (x,y)=(3.5, 2.5), (3.5, 3.0), and (4.0, 2.75) in FIG. 1B and FIG. 4) are updated by a weighted averaging technique, such as Shepard's Method using data from $P_i$ in addition to data from $A_0$. Now, the three points at (3.5, 2.5), (3.5, 3.0), and (4.0, 2.75) in FIG. 4 will be interpolated or evaluated using the values of (x,y)=(3.5, 2), (3.5, 2.75), (4, 2.5) from the set $P_i$, and the values at (x,y)=(4,2), and (4,3) from the set $A_0$. It is believed that using these closer points would produce improved printer signals.

These newly derived mappings, which map regular printer signals to empirically derived colorimetric or device independent signals, are used initially in an inverse tetrahedral interpolation process, to produce a mapping of regular colorimetric signals to printer signals. This mapping is then loaded and used, for example to interpolate printer signals to produce an improved response for the color represented by the open circle of FIG. 4.

The inventive method of improving printer linearity suggests that: given a filled rectangular array of points $A_0$ mapping printer signals to device independent or colorimetric color space signals, it is desirable to add some set of points $P_i$, were i=1, 2 ... N, in such a way that a filled rectangular array of points is derived. This requirement is accomplished in four steps:

1) Identify a set of planes such that each new point $P_i$, and each original point defined by $A_0$ will be located at the intersection of three planes in color space;

2) Using the set of points $A_0$ as a starting condition, interpolate a new set of points $A_1$, such that each 3 way intersection of the planes found in step 1) has an associated mapping. Initially, all values of $A_1$ are based on values of $A_0$.

3) Any points in $A_1$ which also have measured values defined by a $P_i$ are updated to the correct (i.e., measured, not interpolated) values of $P_i$.

4) Any points in $A_1$, which are not part of $A_0$ or defined by a value $P_i$, but are near a value of $P_i$, are modified using nearby points in either $A_0$ or $P_i$ with Shepard's interpolation, or some other interpolation method. In the example above, any interpolated points contained within or in the box defined by (x, y)=(3,2) and (4,3) are updated using the three new points and the original values at the corners of the box.

Figure 5:
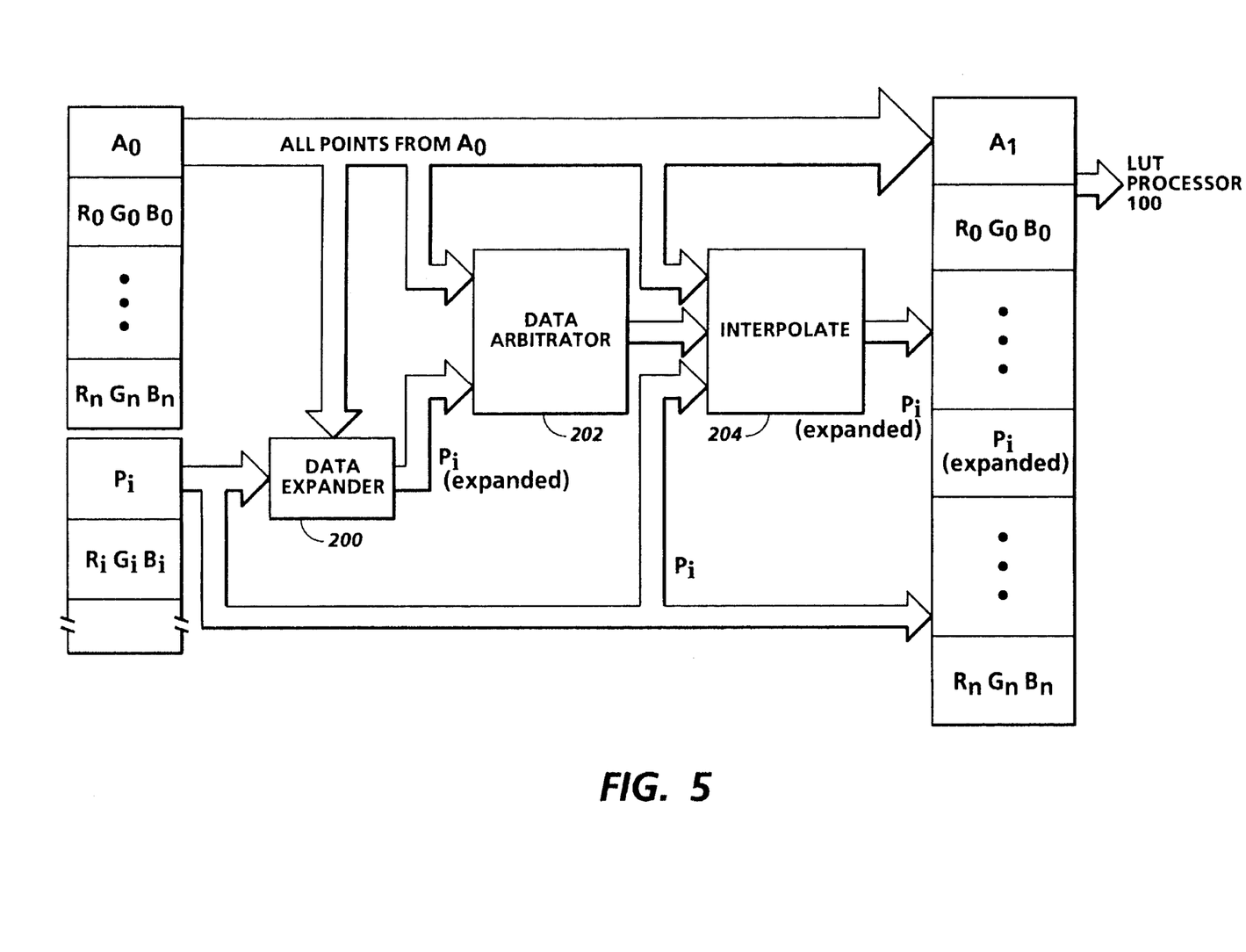
FIG. 5 illustrates the construction of the new color calibration mapping using the method and system described herein.

FIG. 5 illustrates the data flow in the system to accomplish the goals of the invention. The color space mappings forming mapping set $A_0$ (the flawed mapping) will be used as the basis for creating the new mapping set $A_1$ (the corrected mapping). Mappings $P_i$ are generated in a standard manner, but are concentrated in color space in the region where any non-linearity was noted. The $P_i$ mappings (there may be one, or any number required to represent the non-linearity) are directed from interpatch correlation 80, to data expander 200, which can conveniently be a function within LUT processor 100, to produce from the $P_i$ values a set of $P_{i(expanded)}$ mappings, including the $P_i$ mappings and all the mappings required to fill the array based on the addition of the $P_i$ mappings. The $P_{i(expanded)}$ mappings are entered into the mapping set $A_1$.

There is likely to be overlap between the $A_0$ and $P_{i(expanded)}$ mappings. That overlap can be handled in a two step process: 1) wherever there is an empirically derived mapping of $P_i$, such empirically derived mapping is substituted in A i instead of $A_0$, and 2) in regions closely adjacent in space to any of the new empirically derived mappings, the interpolated values are modified using the $P_i$ mappings and the $A_0$ mappings. Points are deemed to be closely adjacent if they fall within a rectangle (or a box in 3-D space) which also contains a new empirically derived mapping. Thus, arbitrator 202 operates on $P_i$ and $A_0$ to arbitrate the data which is loaded. Interpolator 204 operates using $P_i$ and $A_0$ as required by arbitrator 202, to generate new interpolated data for points near the new empirically derived mappings. These functions can be accomplished within function within LUT processor 100.

The new mappings are directed to LUT processor 100, in order to generate a new color transformation LUT for storage at color space transform and color correction 20.

It will no doubt be appreciated that while we have shown the use of the invention in the conversion of a device independent color space to a device dependent color space, the invention applies equally as well to conversions to any transformation from a first space to a second, device independent or device dependent.

It will no doubt be appreciated that the invention can be accomplished with either software, hardware or combination software-hardware implementations.

The invention has been described with reference to a particular embodiment. Modifications and alterations will occur to others upon reading and understanding this specification. It is intended that all such modifications and alterations are included insofar as they come within the scope of the appended claims or equivalents thereof.

We claim:

1. A method of improving calibration in a calibrated color printing system, the color printing system having a calibration derived from a filled rectangular array of color mappings defined by a first color mapping set $A_0$, in which printer signals are mapped to colorimetric signals throughout the gamut of the color printing system, including the steps of:

a) empirically generating a second color mapping set $P_i$, mapping printer signals to colorimetric signals, said second color mapping set $P_i$ smaller than the first color mapping set $A_0$ and overlapping a portion of the printer gamut therewith;

b) using said second color mapping set $P_i$ and a first set of planes corresponding to the first color mapping set $A_0$, identifying an expanded set of planes in which each mapping in the first color mapping set $A_0$ and each mapping in said second color mapping set $P_i$ are defined by points located at an intersection of three planes, the intersecting points of the expanded number of planes defining a set of points $P_{i(expanded)}$ corresponding to a third color mapping set $P_{i(expanded)}$;

c) generating a full rectangular array of color mappings defined by color mapping set $A_1$, from the first color set mapping $A_0$, said second color set mappings $P_i$ and said third color mapping set $P_{i(expanded)}$;

d) generating a new calibration for said printing system derived from said color mappings $A_1$.

2. The method as defined in claim 1, wherein said step of generating a full rectangular array of color mappings defined by color mapping set $A_1$ includes the substep of using any empirically derived mapping from color mapping sets $A_0$ or $P_i$ in place of a non-empirically derived mapping.

3. The method as defined in claim 1, wherein said step of generating a full rectangular array of color mappings defined by color mapping set $A_1$ includes the substep replacing any mappings in third color mapping set $P_{i(expanded)}$ that are near mappings of second color mapping set $P_i$, with mappings which take into account the $P_i$ mappings.

4. A calibrated color printing system, the color printing system having a calibration stored in a calibration memory derived from a filled rectangular array of color mappings defined by a first color mapping set $A_0$, in which printer signals are mapped to colorimetric signals throughout a gamut of the color printing system, including the steps of:

a) means for empirically generating a second color mapping set $P_i$, mapping printer signals to colorimetric signals, said second color mapping set $P_i$ smaller than the first color mapping set $A_0$ and overlapping a portion of the printer gamut therewith;

b) means for using said second color mapping set $P_i$ and a first set of planes corresponding to the first color mapping set $A_0$, identifying an expanded set of planes in which each mapping in the first color mapping set $A_0$ and each mapping in said second color mapping set $P_i$ are defined by points located at an intersection of three planes, the intersecting points of the expanded number of planes defining a set of points $P_{i(expanded)}$ corresponding to a third color mapping set $P_{i(expanded)}$;

c) means for generating a full rectangular array of color mappings defined by color mapping set $A_1$, from the first color set mapping $A_0$, said second color set mappings $P_i$ and said third color mapping set $P_{i(expanded)}$;

d) means for generating a new calibration for said printing system derived from said color mappings $A_1$.

5. The device as defined in claim 4, wherein said means for generating a full rectangular array of color mappings defined by color mapping set $A_1$ includes means for using any empirically derived mapping from color mapping sets $A_0$ or $P_i$ in place of a non-empirically derived mapping.

6. The device as defined in claim 4, wherein said means for generating a full rectangular array of color mappings defined by color mapping set $A_1$ includes means for replacing any mappings in third color mapping set $P_{i(expanded)}$ that are near mappings of second color mapping set $P_i$, with mappings which take into account the $P_i$ mappings.

7. A method of recalibrating a color printing system in a color space region of non-linearity, the color printing system having a first calibration stored in a calibration memory, said first calibration derived from a filled rectangular array of color mappings defined by a first color mapping set $A_0$, in which printer signals are mapped to colorimetric response signals throughout a gamut of the color printing system, including the steps of:

a) directing a correction set of printer signals to said printing system to print a set of color patches with colorants on a medium corresponding to a color space region of non-linearity;

b) measuring colorimetric response of said printer in said color space region of non-linearity from said set of color patches and generating colorimetric response signals indicative thereof;

c) generating a second color mapping set $P_i$, mapping the correction set of printer signals to colorimetric response signals, said second color mapping set $P_i$ smaller than the first color mapping set $A_0$ and overlapping a portion of the printer gamut therewith;

d) using said second color mapping set $P_i$ and a first set of planes corresponding to the first color mapping set $A_0$, identifying an expanded set of planes in which each mapping in the first color mapping set $A_0$ and each mapping in said second color mapping set $P_i$ are defined by points located at an intersection of three planes, the intersecting points of the expanded number of planes defining a set of points $P_{i(expanded)}$ corresponding to a third color mapping set $P_{i(expanded)}$;

e) generating a full rectangular array of color mappings defined by color mapping set $A_1$, from the first color set mapping $A_0$, said second color set mappings $P_i$ and said third color mapping set $P_{i(expanded)}$;

f) applying an inverse interpolation process to said color mapping set $A_1$ to derive a new mapping of colorimetric response signals to printer signals, addressable by said colorimetric response signals, thereby generating a new calibration for said printing system.

8. The method as defined in claim 7, wherein said step of generating a full rectangular array of color mappings defined by first color mapping set $A_1$ includes means for using any measured colorimetric response mapping from color mapping sets $A_0$ or $P_i$ in place of an interpolation derived mapping.

9. The method as defined in claim 7, wherein said step of generating a full rectangular array of color mappings defined by color mapping set $A_1$ includes means for replacing any mappings in third color mapping set $P_{i(expanded)}$ that are near mappings of second color mapping set $P_i$, with mappings which take into account the $P_i$ mappings.

* * * * *